United States Patent

Hulsebus

[11] Patent Number: 6,070,295
[45] Date of Patent: Jun. 6, 2000

[54] QUICK RELEASE TOILET SEAT HINGE WITH SWIVEL

[75] Inventor: Randy K. Hulsebus, Plymouth, Wis.

[73] Assignee: Bemis Manufacturing Company, Sheboygan Falls, Wis.

[21] Appl. No.: 09/158,594

[22] Filed: Sep. 22, 1998

[51] Int. Cl.[7] ........................................... E05D 7/10
[52] U.S. Cl. ................. 16/254; 16/258; 16/270; 403/353; 403/375; 403/315
[58] Field of Search ............. 16/254, 257, 259, 16/258, 260–263, 270, 265; 4/236, 234, 237, 240; 403/353, 321, 375, 315, 316, 329, 326

[56] References Cited

U.S. PATENT DOCUMENTS

| 4,080,671 | 3/1978 | Stähli | 4/236 |
| 4,133,061 | 1/1979 | Hurd | 4/236 |
| 4,159,548 | 7/1979 | Hewson | 16/257 |
| 4,309,780 | 1/1982 | Fantetti | 4/234 |
| 4,319,365 | 3/1982 | Bemis | 4/236 |
| 4,326,307 | 4/1982 | Baillie et al. | 4/236 |
| 4,832,573 | 5/1989 | Dorski | 403/375 |
| 4,970,731 | 11/1990 | Fait | 4/234 |
| 5,175,891 | 1/1993 | Ohshima et al. | 4/236 |
| 5,515,552 | 5/1996 | Tolsma | 4/236 |

FOREIGN PATENT DOCUMENTS

| 563206 | 9/1958 | Canada | 16/263 |
| 917032 | 8/1954 | Germany . | |
| 214376 | 4/1961 | Germany . | |
| 44 09 516 | 9/1994 | Germany . | |
| 674658 | 6/1952 | United Kingdom . | |
| 692276 | 6/1953 | United Kingdom . | |

Primary Examiner—Chuck Y. Mah
Attorney, Agent, or Firm—Michael Best & Friedrich LLP

[57] ABSTRACT

A toilet seat hinge for releasably securing a toilet seat to a toilet bowl. The hinge comprises a mounting post and a hinge post. The mounting post is fixed to the toilet bowl. Various alternative constructions are employed for releasably securing the hinge post to the mounting post such that the hinge post and the toilet seat can be removed from the toilet bowl without removing the mounting post.

31 Claims, 11 Drawing Sheets

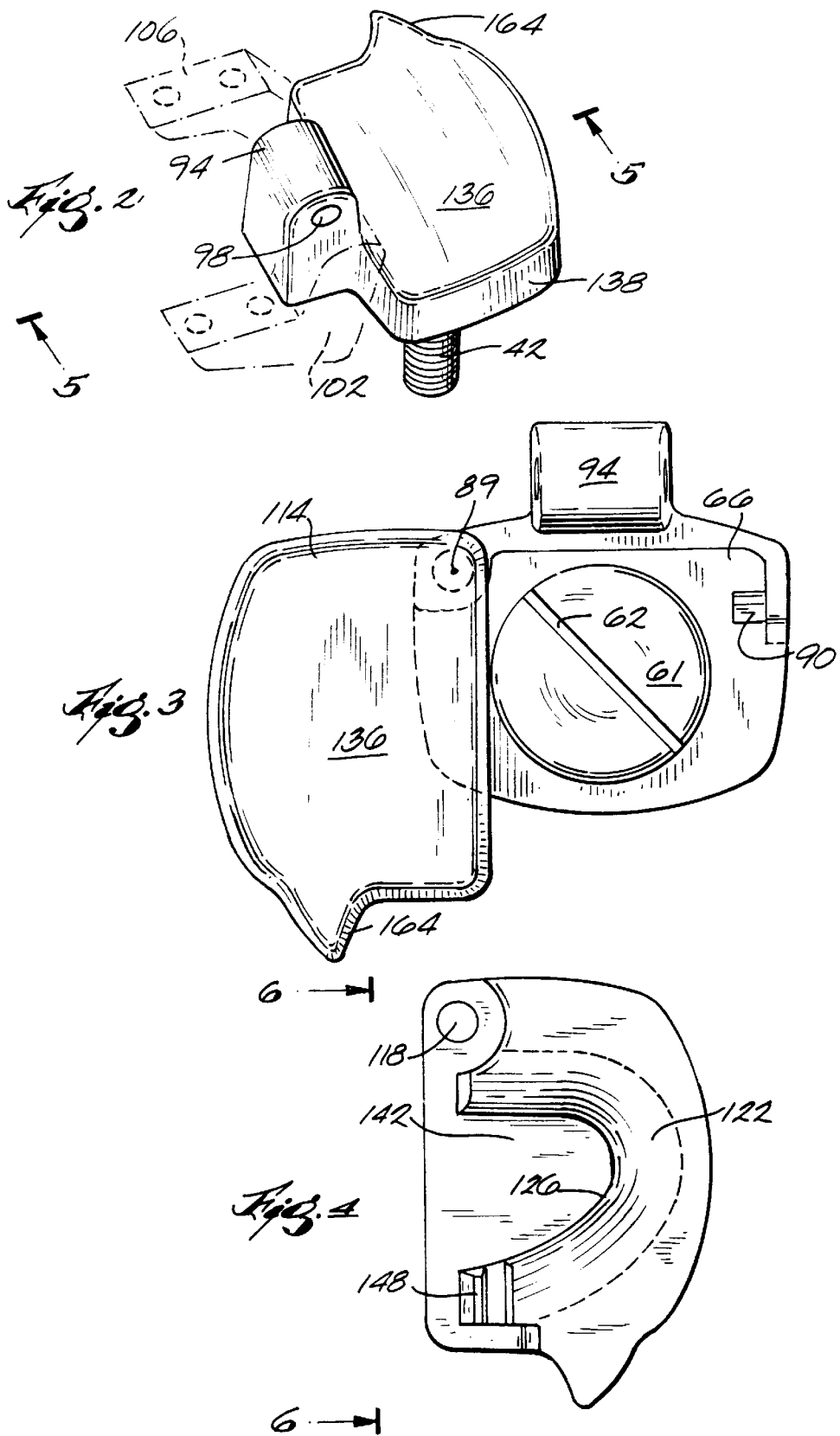

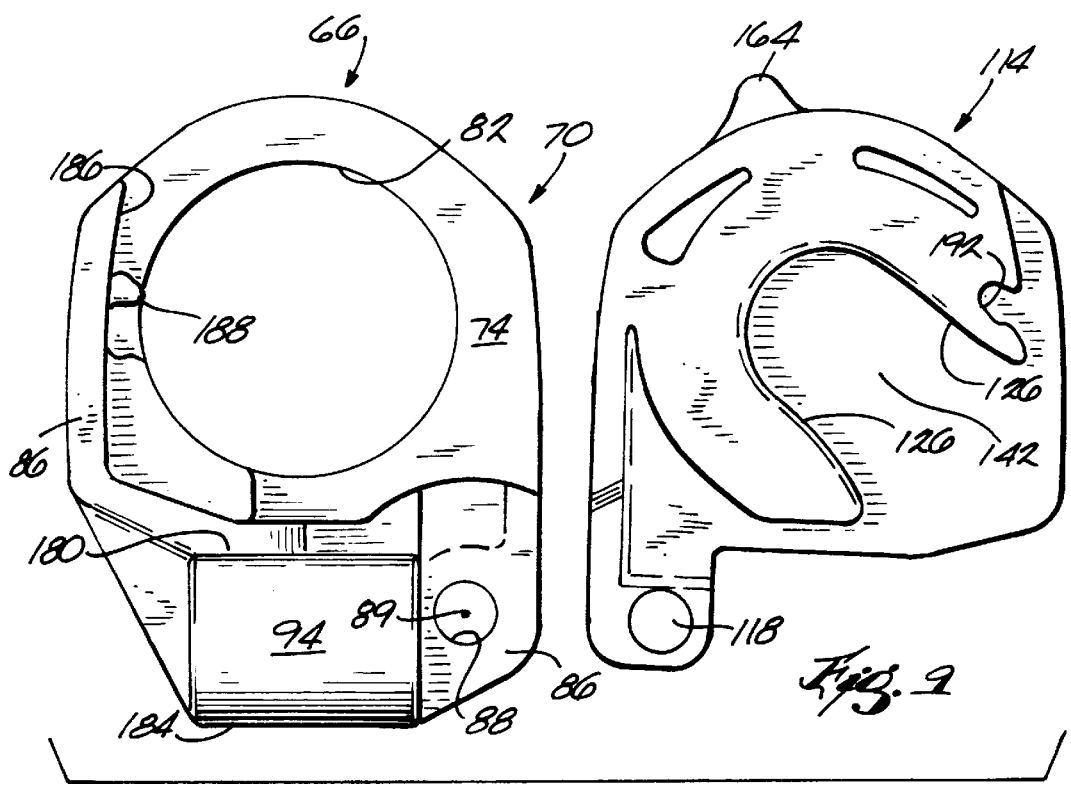
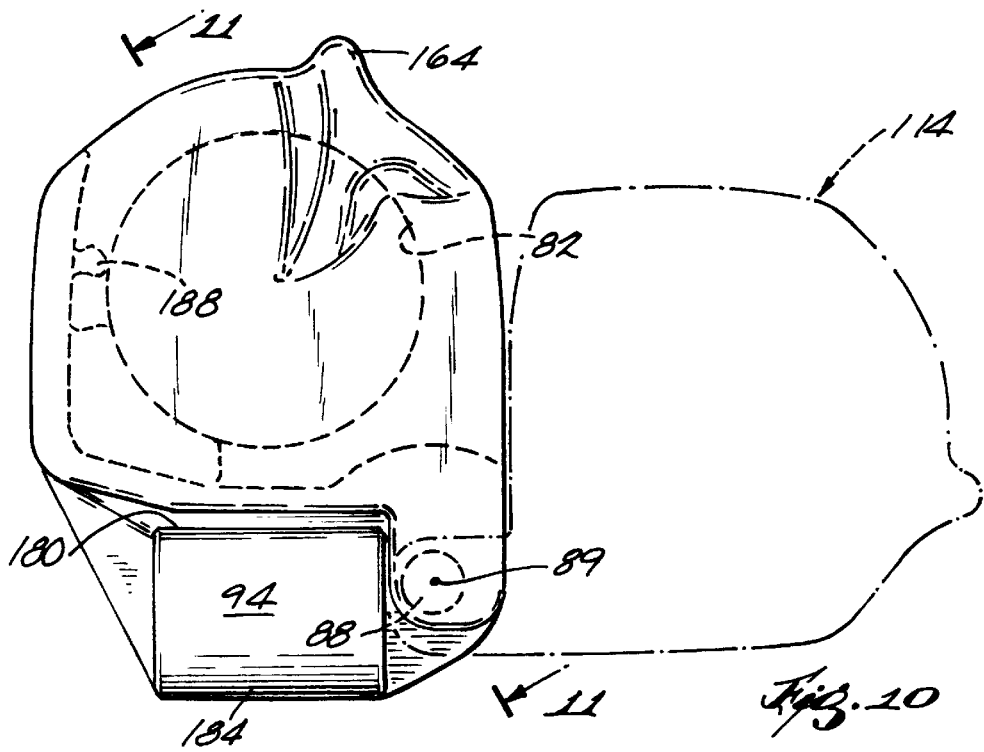

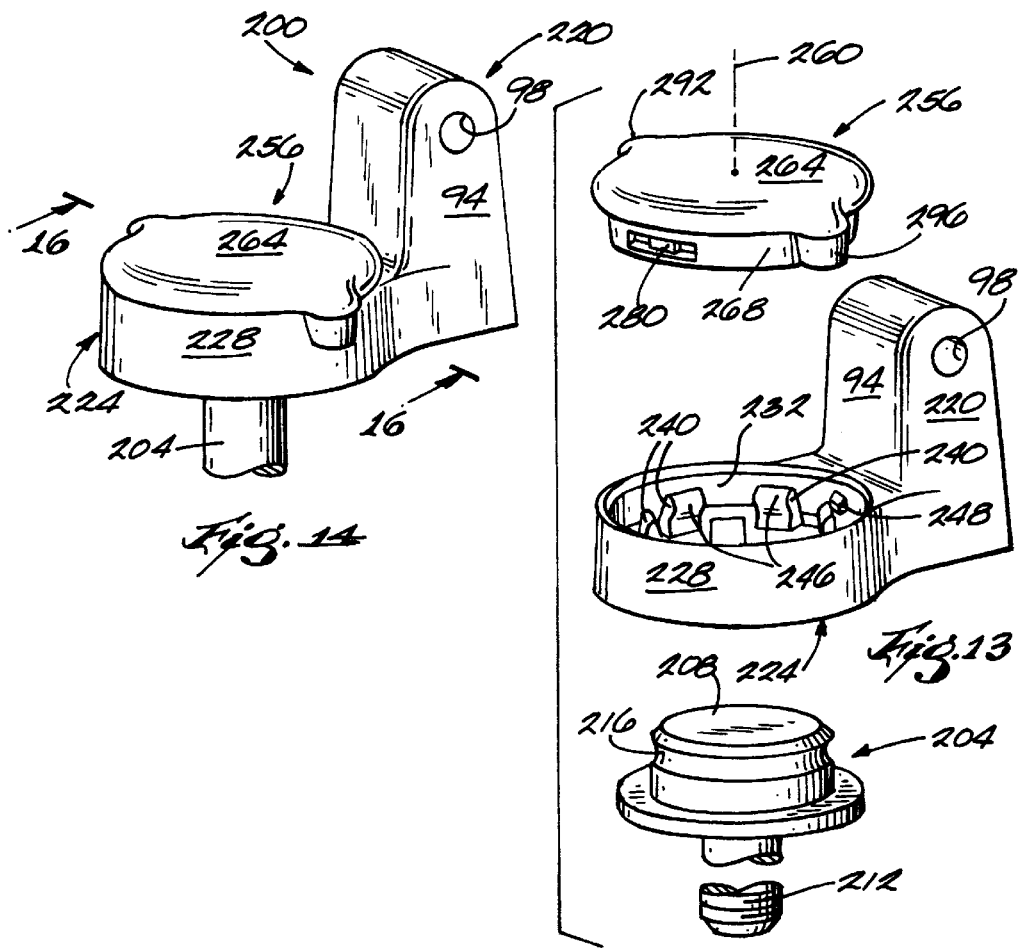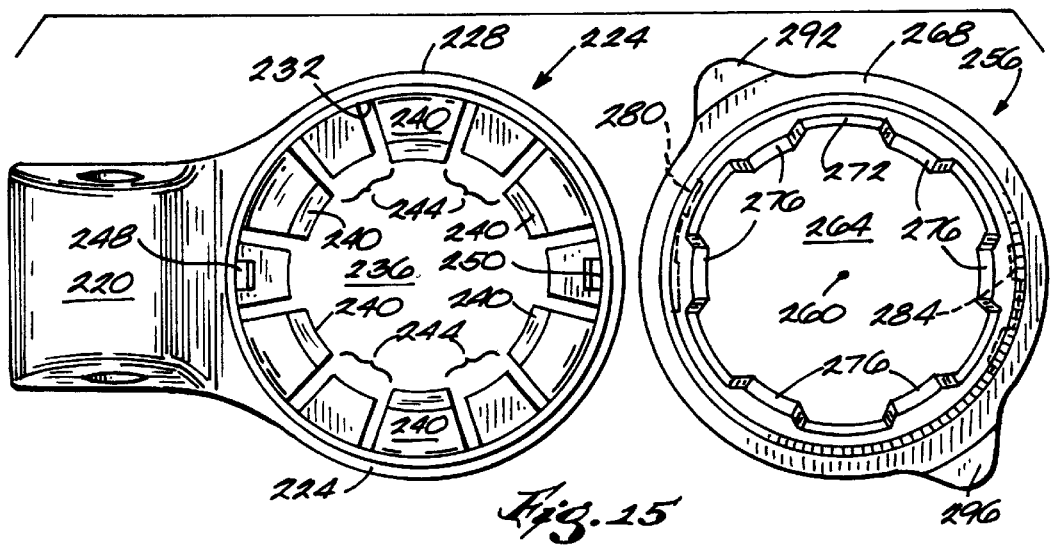

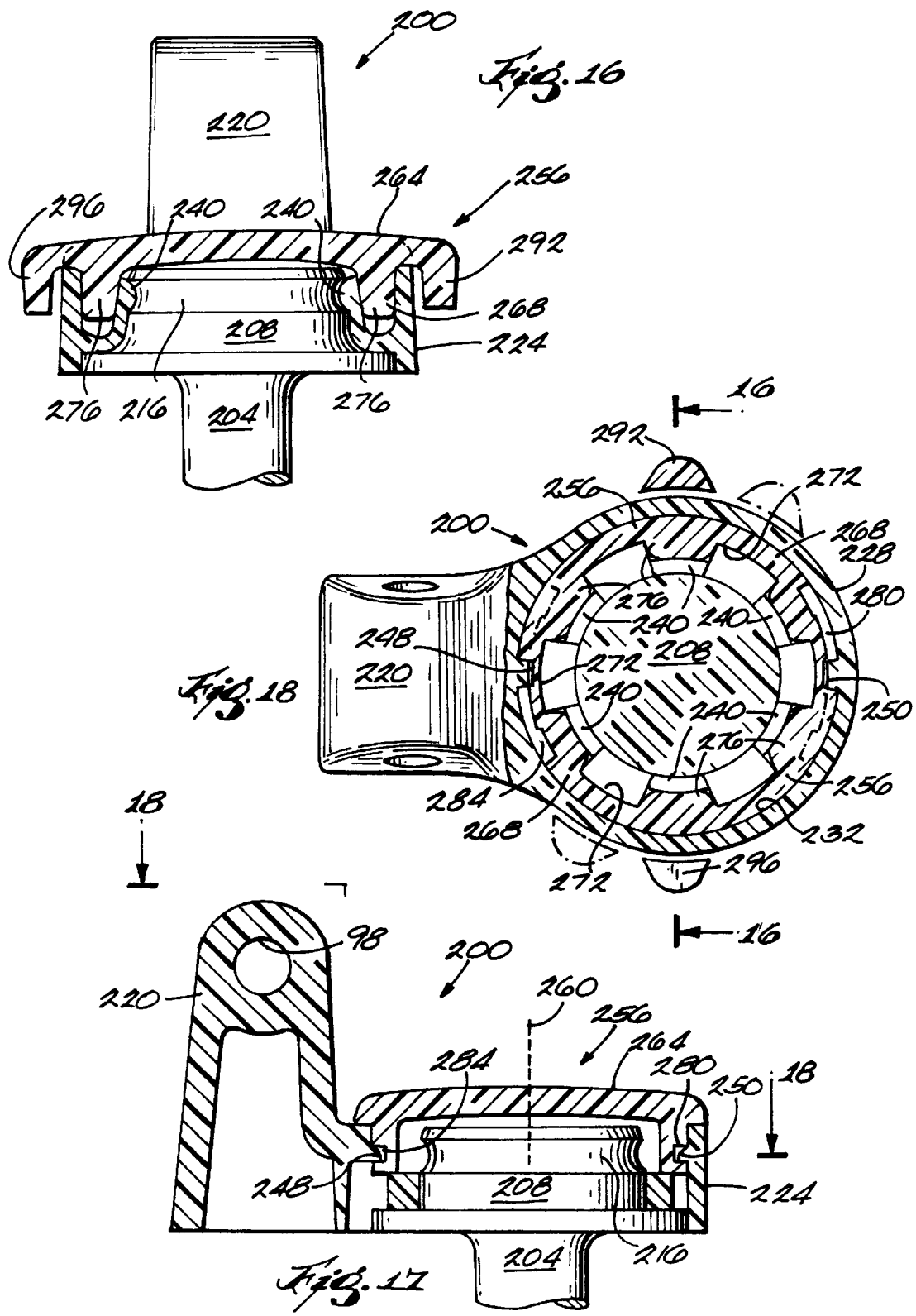

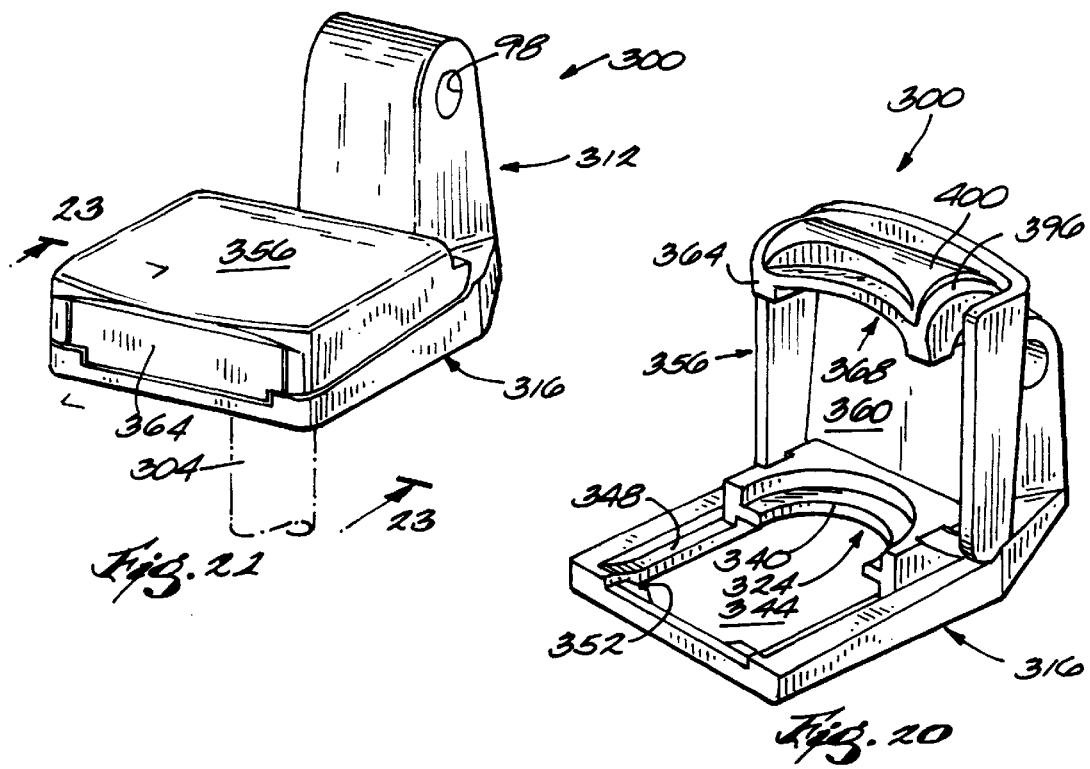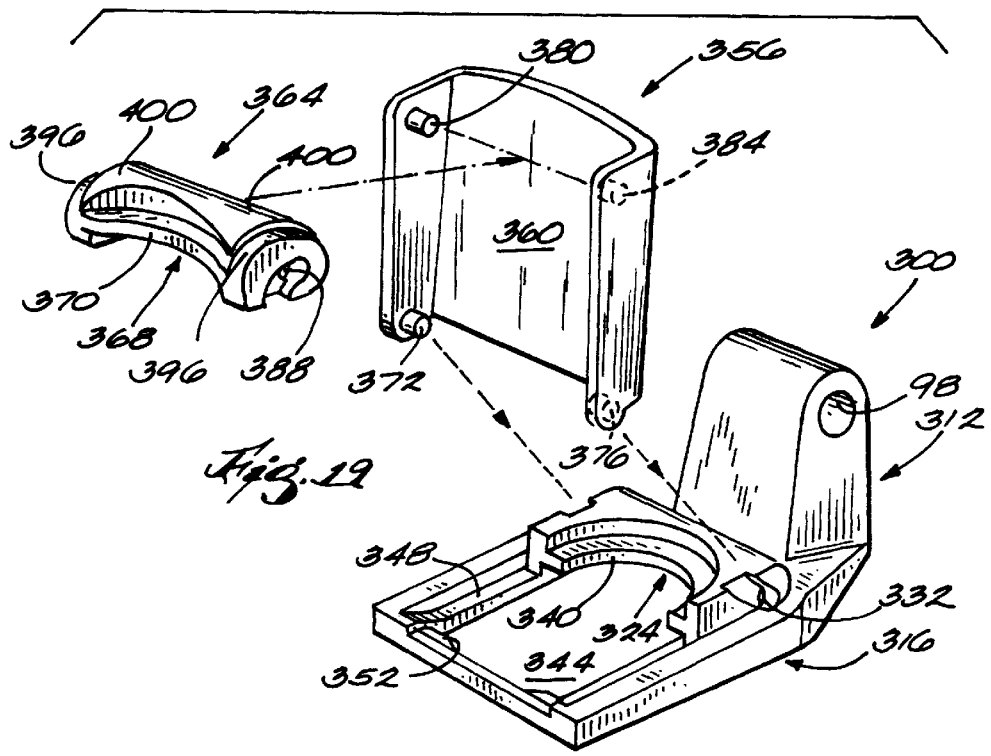

QUICK RELEASE TOILET SEAT HINGE WITH SWIVEL

BACKGROUND

This invention relates to a toilet seat hinge for releasably securing a toilet seat to a toilet bowl. Easy removal of the toilet seat from the toilet bowl facilitates cleaning of the toilet bowl, toilet seat and toilet seat hinges. Ease of cleaning these components promotes hygiene.

Most toilet seats are pivotally secured to posts which are in turn secured to the toilet bowl flange by means of bolts extending through the flange. This assembly provides good stability. However, such an assembly hinders cleaning of the toilet bowl, especially between the posts.

Many different kinds of toilet seat release mechanisms have been devised to improve the ease of cleaning toilets. U.S. Pat. No. 4,309,780 discloses a releasable toilet seat hinge comprising a plate-like support unit, a pair of anchoring elements with lateral notches, and a pair of rotary locking pins with peripheral grooves. Rotation of each locking pin about a horizontal axis aligns the locking pin groove with the corresponding anchoring element notch, allowing the release of the support plate and attached toilet seat from the anchoring elements. U.S. Pat. No. 4,326,307 discloses an assembly for detachably securing a toilet seat to a toilet bowl, the assembly comprising a hinge with a socket which snaps onto a spherical head on the mounting post.

SUMMARY OF THE INVENTION

The invention provides an improved toilet seat hinge which is inexpensive to manufacture, is easy to attach and remove, is aesthetically pleasing and provides secure fastening of a toilet seat to a toilet bowl.

More particularly, the invention provides a toilet seat hinge comprising a mounting post, a hinge post and a latch member. The mounting post is preferably threaded and is fixed to a toilet bowl flange with a nut. In the preferred embodiment, the mounting post has a mounting post head with an annular recess for engaging the latch member, as explained below.

The hinge post is pivotally connected to the toilet seat. The hinge post has a base portion having therein a mounting post hole so that the hinge post may be positioned over the mounting post, with the mounting post head extending through the mounting post hole. The annular recess of the mounting post head is above the upper surface of the base portion of the hinge post.

In one embodiment, the latch member includes a generally horizontal top wall, and a generally horizontal, generally U-shaped projection below the top wall. The latch member is pivotable relative to the hinge post about a generally vertical axis so that the latch member is movable in a generally horizontal plane between a latched position and an unlatched position. When the latch member is in the latched position, the U-shaped projection of the latch member extends into the annular recess of the mounting post so that the engagement of the U-shaped projection with the mounting post head prevents upward movement of the latch member and the hinge post relative to the mounting post. When the latch member is in the latched position, the top wall of the latch member covers the mounting post to give the entire toilet seat hinge a clean appearance. When the latch member is in the unlatched position, the U-shaped projection on the latch member is removed from the annular recess of the mounting post head so as to allow upward movement of the latch member and the hinge post relative to the mounting post and the toilet bowl.

In an alternative embodiment, the mounting post includes a head having therein at least one recess, preferably a single annular recess. The hinge post includes a plurality of flexible projections. The flexible projections are angularly spaced so that a plurality of gaps are defined. When the hinge post is placed over the mounting post, each flexible projection extends into the single annular recess. The toilet seat hinge also includes a locking member which includes a plurality of locking projections. The locking member may be placed over the mounting post head and hinge post flexible projections so that the locking member is movable between locked and unlocked positions. In the locked position, the locking member projections are aligned with the flexible projections, which prevents the outward movement of the flexible projections from the annular recess, thus securing the hinge post to the mounting post. In the unlocked position, the locking member projections are aligned with the gaps, which allows the flexible projections to move out of the annular recess when the hinge post is removed from the mounting post.

In another alternative embodiment, the mounting post includes first and second engagement portions, preferably diametrically opposed portions of a single annular recess in the mounting post head. The hinge post includes a camming surface and an engagement portion, preferably a C-shaped projection. The hinge post is placed over the mounting post and then moved horizontally relative to the mounting post so that the C-shaped projection on the hinge post moves into one side of the annular recess. The hinge also includes a latch member. The latch member includes a main portion pivotally mounted on the hinge post. The latch member also includes a locking member pivotally mounted on the latch member main portion. The locking member including a latch member projection, and a camming surface. When the main portion is pivoted downwardly relative to the hinge post, the latch member camming surface engages the hinge post camming surface. The engagement of the camming surfaces causes the locking member to pivot relative to the main portion so that the latch member projection extends into the mounting post annular recess, thereby releasably securing the hinge post to the mounting post.

Other features and advantages of the invention will become apparent to those skilled in the art upon review of the following detailed description, claims and drawings.

DESCRIPTION OF THE DRAWINGS

FIG. 2 is a top view of the toilet seat hinge with the latch member in the latched position.

FIG. 3 is a top view of the toilet seat hinge with the latch member in the unlatched position.

FIG. 4 is bottom view of the latch member.

FIG. 9 is an exploded view of the hinge of FIG. 7 showing the top of the hinge post and the bottom of the latch member.

FIG. 10 is a top view of the toilet seat hinge of FIG. 7 with the latch member in the unlatched position.

FIG. 13 is an exploded perspective view of a toilet seat hinge that is another embodiment of the invention.

FIG. 14 is a perspective view of the toilet seat hinge of FIG. 13 with the locking member mounted on the hinge post.

FIG. 15 is an exploded plan view of the hinge of FIG. 13 showing the top of the hinge post and the bottom of the locking member.

FIG. 16 is a cross-sectional view taken along line 16—16 in FIGS. 14 and 18.

FIG. 17 is a cross-sectional view of the toilet seat hinge of FIG. 13.

FIG. 18 is a cross-sectional view taken along line 18—18 in FIG. 17.

FIG. 19 is an exploded perspective view of a toilet seat hinge that is an alternative embodiment of the invention.

FIG. 20 is a perspective view of the toilet seat hinge of FIG. 19 with the latch member in the unlocked position.

FIG. 21 is a perspective view of the toilet seat hinge of FIG. 19 in the locked position.

Figure 1:
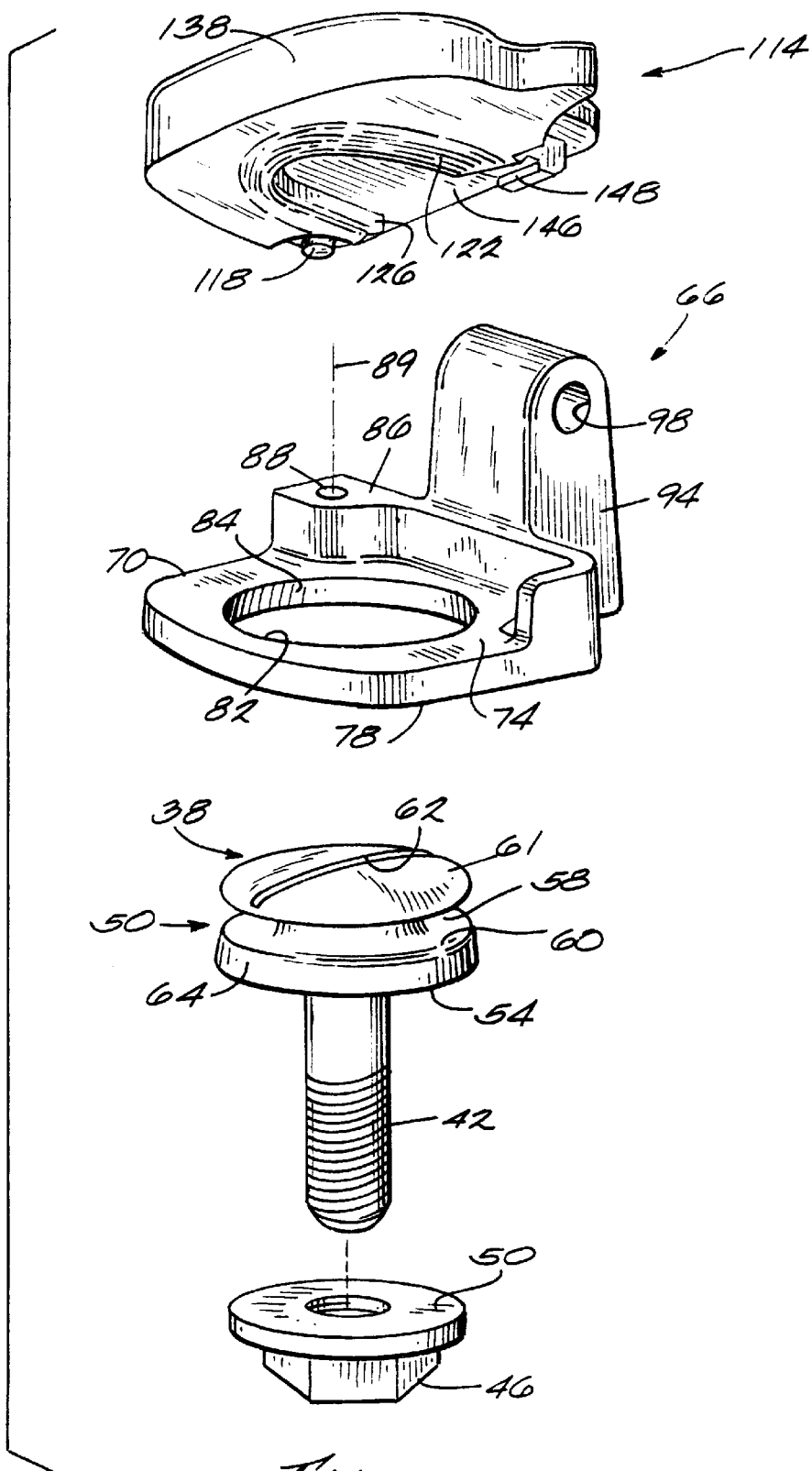
FIG. 1 is a partial exploded perspective view of a toilet seat hinge embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Figure 5:
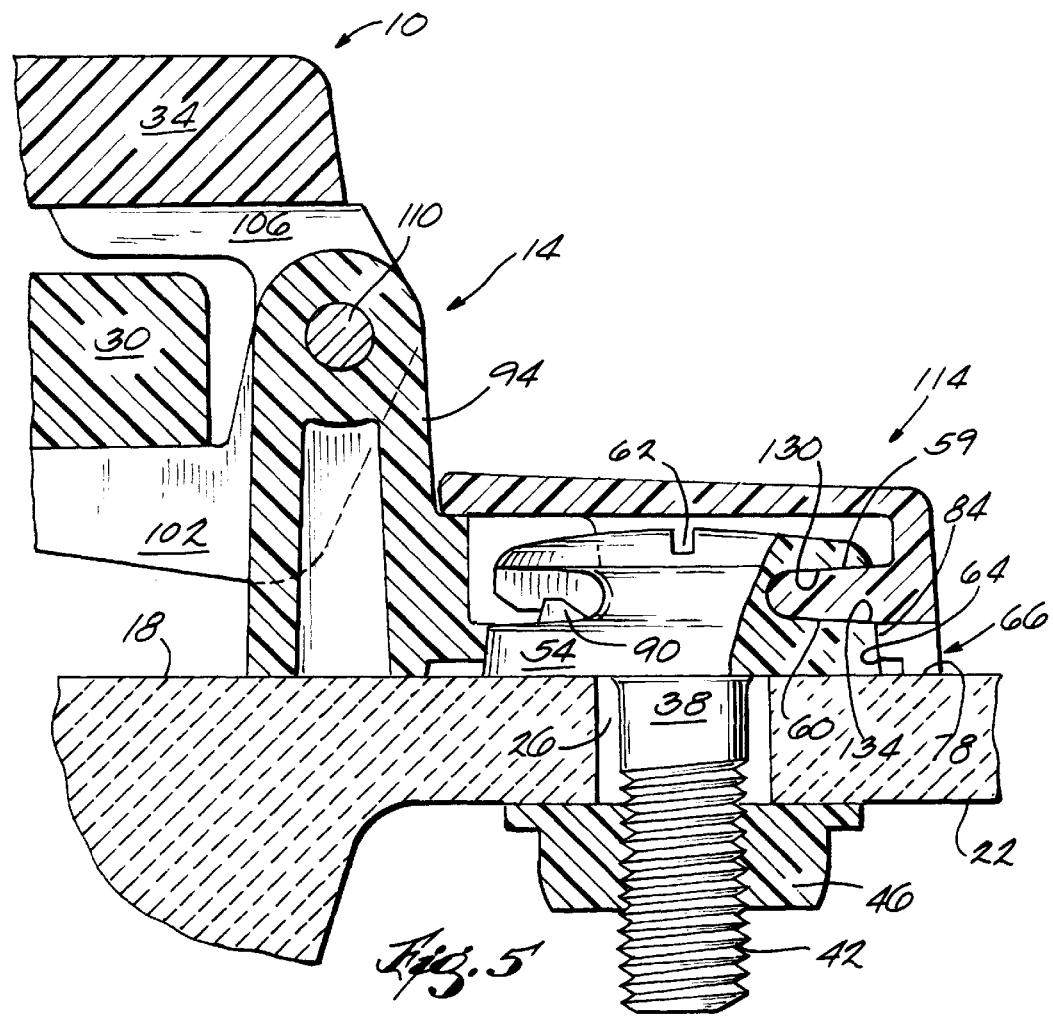
FIG. 5 is a cross-sectional view taken along line 5—5 in FIG. 2.

A toilet 10 having toilet seat hinges 14 (only one shown) embodying the invention is partially illustrated in FIG. 5. The toilet 10 comprises a toilet bowl 18 with a flange 22 having therein a pair of holes 26 (only one shown). The toilet also comprises a toilet seat 30 (partially shown) and a toilet cover 34 (partially shown). The toilet seat hinges 14, preferably made of injected molded plastic, pivotally support the toilet seat 30 and the toilet seat cover 34. The toilet seat hinges 14 are substantially identical, and only one hinge 14 will be described in detail.

FIG. 1 is an exploded view of the toilet seat hinge 14. The hinge 14 comprises a mounting post 38 which is insertable into the toilet seat flange hole 26. More particularly, the mounting post 36 includes a threaded portion 42 which extends through the flange hole 26. The mounting post 38 is secured to the toilet bowl 18 by means of a nut 46 (see FIG. 5) threaded onto the threaded portion 42 of the mounting post 38 beneath the flange 22. The nut 46 includes an upper surface 50 with a diameter greater than the flange hole 26 so that upward movement of the mounting post 38 through the flange hole 26 is prevented when the nut 46 is in place. The mounting post also includes an engagement portion 50. In the preferred embodiment, the engagement portion 50 comprises a mounting post head 54 having therein an annular recess 58 defined by an upper tapered annular surface 59 and a lower tapered annular surface 60, the purposes of which are explained below. The mounting post head 54 has a diameter exceeding the diameter of the flange hole 26 so that the mounting post 38 is supported by the flange 22. The mounting post head 54 includes an upper portion 61, which has therein a slot 62 for receiving a screwdriver. The mounting post head further includes a tapered annular surface 64, the purpose of which will be explained below.

The toilet seat hinge 14 also comprises (see FIGS. 1, 2 and 5) a hinge post 66 to which the toilet seat 30 and toilet cover 34 are pivotally attached, as explained below. The hinge post 66 (see FIG. 1) includes a base portion 70. The base portion 70 has an upper surface 74 and a lower surface 78. The lower surface 78 of the base portion 70 contacts the flange 22 of the toilet bowl 18. The base portion 70 (see FIG. 1) also has therein a mounting post hole 82 defined by a tapered annular surface 84 extending between the base portion upper surface 74 and lower surface 78. The hinge post 66 is positionable over the mounting post 38 so that the mounting post head 54 extends through the mounting post hole 82. With the hinge post 66 in this position, the annular recess 58 of the mounting post 38 is above the upper surface 74 of the base portion 70 and the mounting post tapered annular surface 64 engages the base portion annular surface 84 to provide a tight fit to substantially prevent lateral movement of the hinge post 66 relative to the mounting post 38. The base portion 70 of the hinge post 66 (see FIG. 1) also includes a ledge portion 86 which extends upwardly from the upper surface 74 of the base portion 70. The ledge portion 86 has therein a latch pin hole 88, the purpose of which will be explained below. The hole 88 is centered on a generally vertical axis 89. The base portion 70 also includes a projection 90, the purpose of which will be described below, which extends upwardly from the base portion upper surface 74.

The toilet seat 30 and toilet seat cover 34 can be supported by the hinge post in any manner known in the art. In the illustrated construction (see FIGS. 1, 2 and 5), the hinge post 66 includes a post portion 94. The post portion 94 of the hinge post 66 extends upwardly from the upper surface 74 of the base portion 70. The post portion 94 has therethrough a horizontal hole 98. A first hinge leaf 102 is connected to the toilet seat 30, and a second hinge leaf 106 is connected to the toilet seat cover 34. A pin 110 extends through the hole in the post portion 94. The first hinge leaf 102 is connected to one end of the pin 110 and the second hinge leaf 106 is connected to the other end of the pin 110. In this manner, the toilet seat 30 and the toilet seat cover 34 are pivotally connected to the post portion 94 so that they may be raised and lowered.

Figure 6:
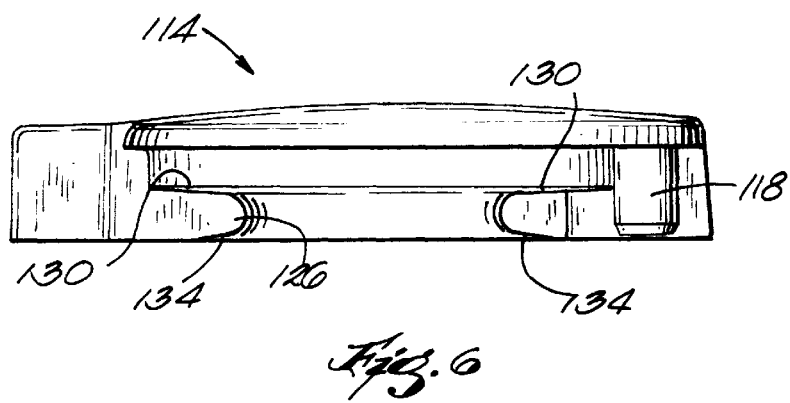
FIG. 6 is a side view taken along line 6—6 in FIG. 4.
Figure 8:
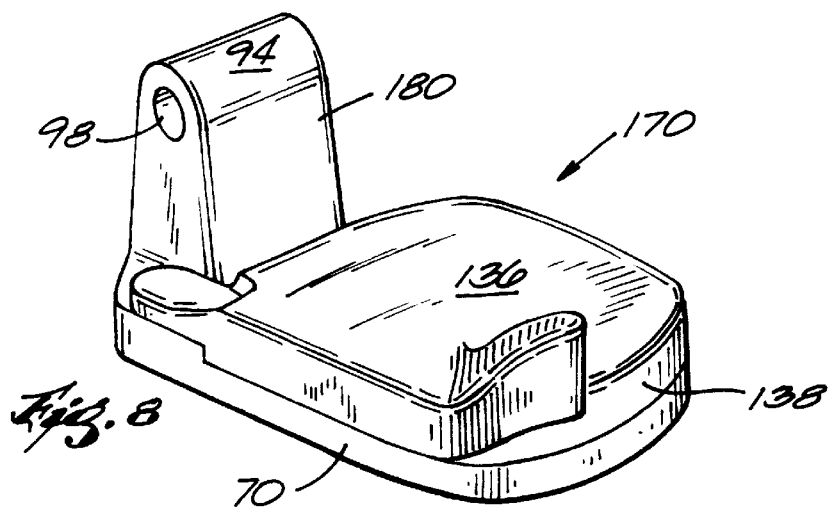
FIG. 8 is a side perspective view of the toilet seat hinge of FIG. 7 with the latch member in the latched position.
Figure 7:
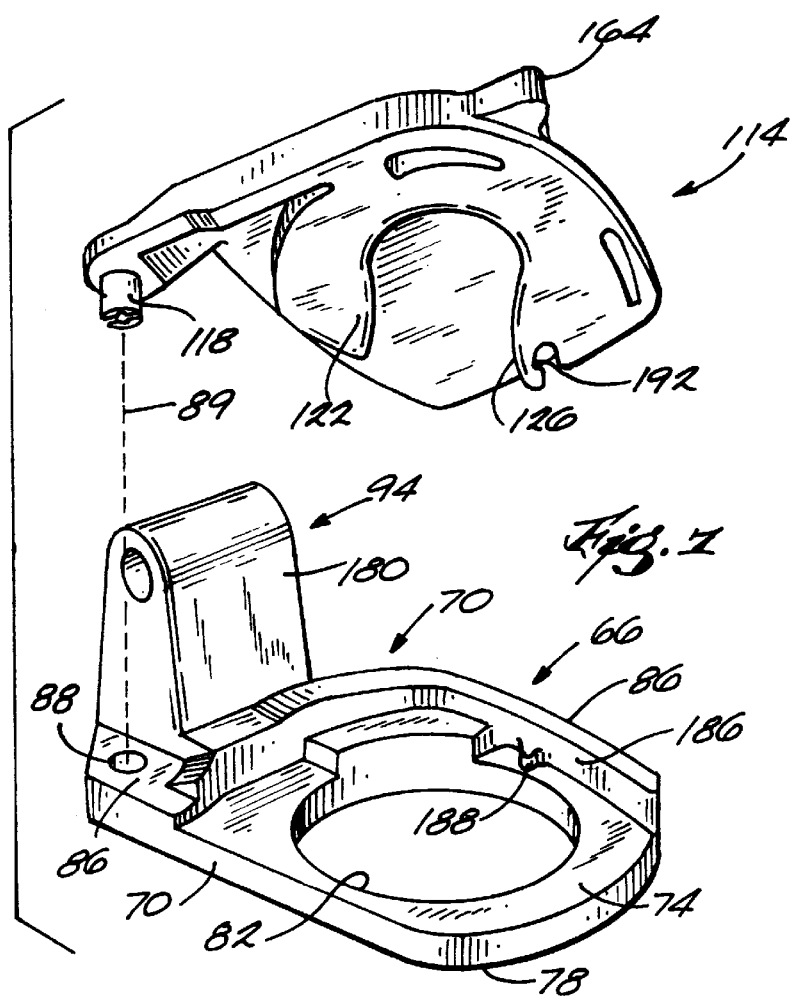
FIG. 7 is a partially exploded perspective view of a toilet seat hinge that is an alternative embodiment of the invention.

The toilet seat hinge 14 (see FIGS. 1, 3 and 4) also comprises a latch member 114. Preferably, the latch member 114 (see FIG. 1) includes a downwardly projecting latch pin 118. The latch pin 118 (see FIG. 6) is insertable into the latch pin hole 88 of the hinge post 66 so that the latch member 114 (see FIG. 3) is pivotable about the axis 89 between latched and unlatched positions. The latch member 114 is above the upper surface 78 of the base portion 70 of the hinge post 66 when in the latched position. When pivoted between the latched and unlatched positions (see FIGS. 2 and 3), the latch member 114 moves in a generally horizontal plane.

The latch member 114 further includes an engagement portion 122. Preferably, the latch member (see FIGS. 1 and 4) engagement portion 122 includes a generally U-shaped, generally horizontal projection 126. The U-shaped projection 126 includes an upper tapered surface 130 and a lower tapered surface 134. When the latch member is in the latched position (see FIG. 6), the U-shaped projection 126 extends into the annular recess 58 of the mounting post head 54 so that the U-shaped projection upper and lower tapered surfaces 130 and 134 engage or are wedged between the mounting post head upper and lower tapered surfaces 59 and 60. This arrangement provides a tight fit and substantially prevents upward movement of the hinge post 66 and toilet seat 30 relative to the toilet bowl 18. In this manner, the toilet seat 30 is secured to the toilet bowl 18.

When the latch member is in the unlatched position, the U-shaped projection 126 is disengaged from the annular recess 58 of the mounting post head 54 to allow upward movement of the latch member 114 and the hinge post 66 relative to the mounting post 38 and the toilet bowl 18. By this operation, the toilet seat 30 may be removed from the toilet bowl 18, improving ease of cleaning.

The latch member 114 (see FIG. 1) also includes a generally horizontal top wall 136 and a generally vertical side wall 138. Together, the top wall 136 and side wall 138 define a generally U-shaped cavity 142. When the latch member 114 is moved between the unlatched and latched positions (see FIG. 6), the upper portion 61 of the mounting post head 54 moves through an opening 146 in the side wall 138 and into the U-shaped cavity 142. When the latch member is in the latched position (see FIGS. 2 and 6), the top wall 136 of the latch member 114 covers the mounting post 38.

The latch member 114 also has therein a latch member recess 148. When the latch member is in the latched position, the hinge post projection 90 extends into the latch member recess 148 so that the latch member 114 is removably secured in the latched position.

The latch member 114 (see FIGS. 2 and 4) also includes a generally triangular projection 164. In use, manual pressure may be exerted against the triangular projection 164 to cause movement of the latch member between the latched and unlatched positions.

Alternative constructions of the engagement portions 50 and 122 are possible. The particular configuration is unimportant as long as a means is provided for engaging and disengaging the latch member 114 and the mounting post 38. For example, the mounting post engagement portion 50 may include a projection (not shown) which is engageable with a recess (not shown) in the latch member engagement portion 122.

Figure 11:
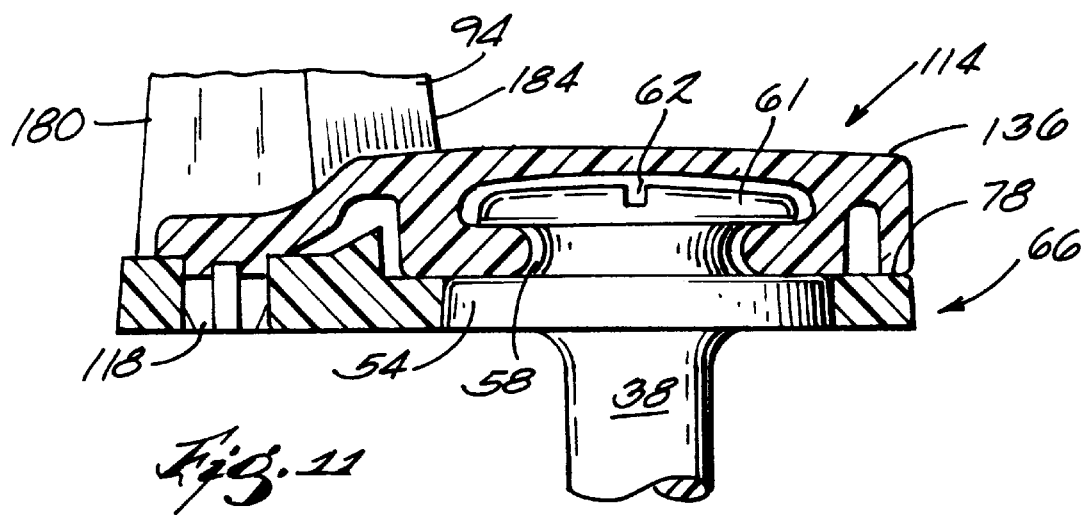
FIG. 11 is a cross-sectional view taken along line 11—11 in FIG. 10.
Figure 12:
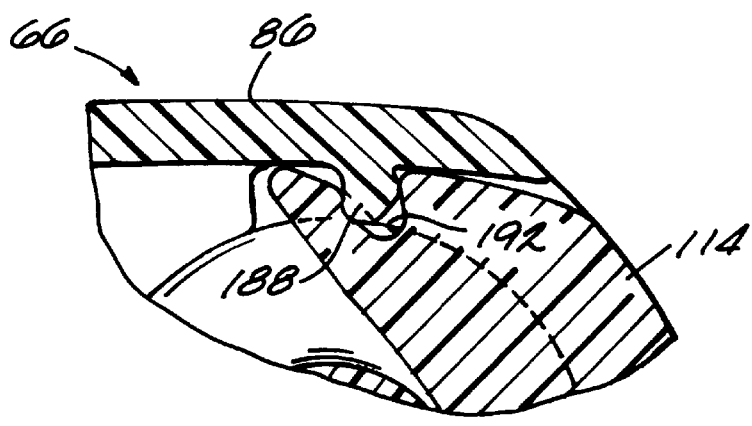
FIG. 12 is an enlarged partial horizontal cross-sectional view of the hinge of FIG. 7 showing the engagement of the hinge post projection with the latch member recess.
Figure 22:
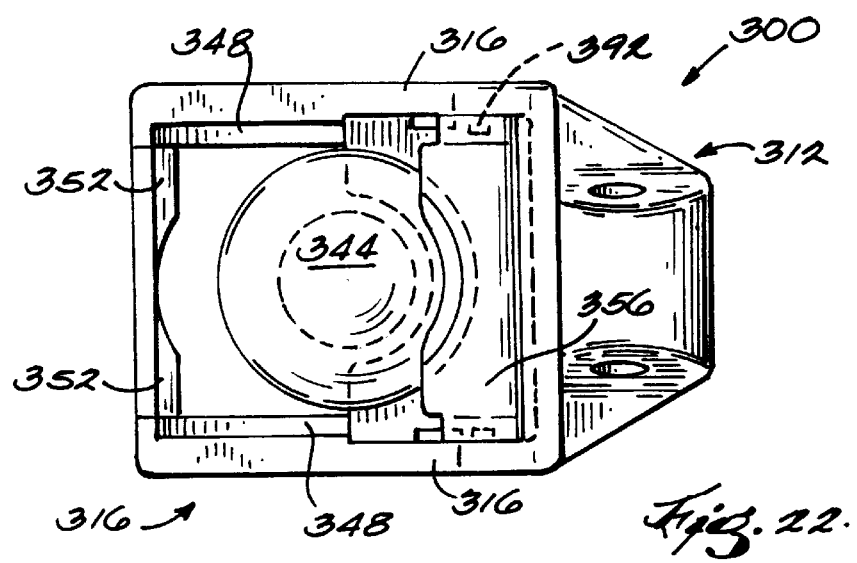
FIG. 22 is top plan view of the toilet seat hinge as shown in FIG. 20.
Figure 23:
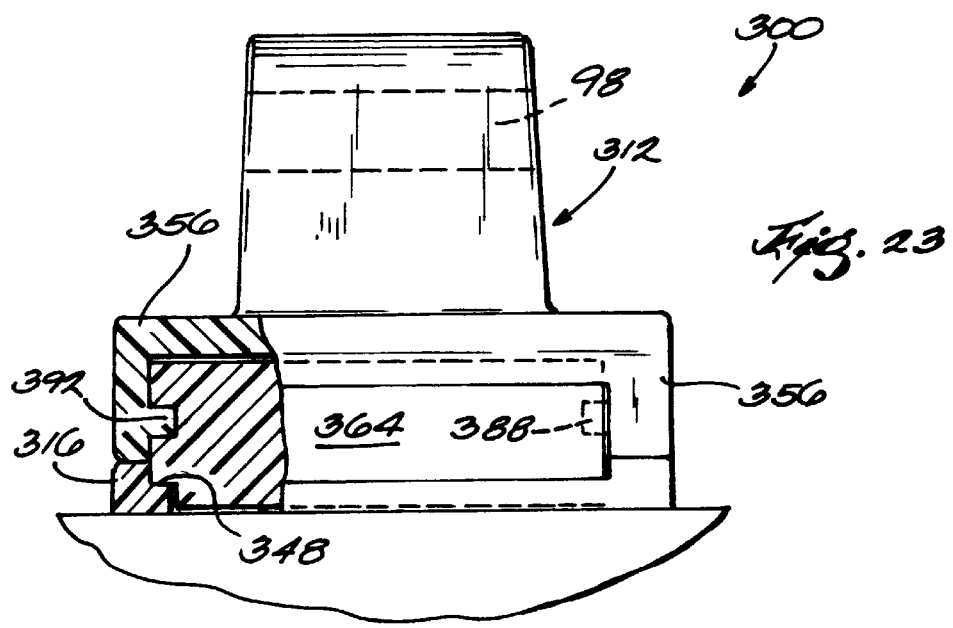
FIG. 23 is cross-sectional view of the toilet seat hinge taken along line 23—23 in FIG. 21.

FIGS. 7–12 illustrate a toilet seat hinge 170 that is an alternative embodiment of the invention. Except as described below, the hinge 170 is substantially identical to the hinge 14, and common elements have been labelled with the same reference numbers. As illustrated in FIGS. 10 and 11, the post portion 94 has a hinge post rearward face 180 and a hinge post forward face 184. As illustrated in FIGS. 9 and 10, the latch pin hole 88 has an axis 89 which is located forward of the rearward face 180 (below in FIGS. 9 and 10). The hinge 170 includes (see FIGS. 7 and 8) a vertical surface 186 between the ledge portion 86 and base portion upper surface 74. A projection 188 extends horizontally from the vertical surface. When the latch member 114 is in the latched position (see FIG. 12), the projection 188 extends into a recess 192 in the latch member 114, thereby releasably securing the latch member 114 in the latched position. As illustrated in FIG. 9, it is necessary that the U-shaped projection 126 be at a different angle than in the embodiment of FIGS. 1–6 to accommodate the changed position of the latch pin axis 89. Also, the position of the projection 164 is different.

FIGS. 13–18 illustrate a toilet seat hinge 200 which is an alternative embodiment of the invention. Except as described below, the hinge 200 is substantially identical to the hinge 14, and common elements have been labelled with the same reference numbers. The hinge 200 includes a mounting post 204 (see FIG. 13). The mounting post 204 includes a head 208 and a threaded portion 212 onto which a nut (not shown) may be threaded to secure the mounting post 204 to the toilet bowl flange (not shown). The mounting post head 208 has therein at least one recess 216. In the preferred embodiment, the head 208 has therein a singular annular recess 216. The purpose of the annular recess 216 is explained below.

The toilet seat hinge 200 also comprises a hinge post 220 to which the toilet seat 30 (not shown) and toilet seat cover 34 (not shown) may be pivotally attached. The hinge post 220 includes a base portion 224. The base portion includes (see FIG. 15) a generally circular wall 228 having an inner surface 232 which defines a hole 236 in the hinge post 220. The hinge post 220 also includes a plurality of flexible projections 240 extending inwardly from the inner surface 232. The flexible projections 240 are evenly spaced angularly about the inner surface 232 and define therebetween a plurality of gaps (indicated by brackets and reference numeral 244 in FIG. 15). Preferably, the gaps 244 have about the same angular extent as the projections 240. The distance between any two diametrically opposed projections 240 is slightly less than the diameter of the mounting post head 208, for reasons that will become apparent.

The hinge post 220 is positionable over the mounting post 204 so that the mounting post head 208 extends through the hinge post hole 236 and deflects the projections 240 outwardly so that each flexible projection 240 snaps into the annular recess 216 in the mounting post head 208 to releasably secure the hinge post 220 to the mounting post 204 (see FIGS. 16 and 18). The projections 240 have respective camming surfaces 246 (FIG. 13) that help the projections 240 snap into and out of the recess 216 when the hinge post 220 is placed over or removed from the mounting post 204. The hinge post also includes (see FIGS. 15 and 17) a pair of locking tabs 248 and 250, spaced about 180° apart, which extend inwardly from the inner surface 232. The purpose of the tabs 248 and 252 will be explained below. Preferably, the entire hinge post 220, including the flexible projections 240, is a unitary member formed from injection molded plastic.

The toilet seat hinge 200 also includes a locking member 256 which is insertable into the hinge post hole 236. The locking member 256 has an axis 260 and includes a top wall 264, an annular side wall 268 having an inner surface 272, and plurality of locking projections 276 extending inwardly from the inner surface 272 or downwardly form the top wall 264 (see FIGS. 15, 17 and 18). The locking projections 276 are angularly spaced about the inner surface 272 so that they may be brought substantially into alignment with either the flexible projections 240 or the gaps 244 when the locking member 256 is inserted into the hinge post hole 236. The locking member side wall 268 also has therein (see FIGS. 13, 17 and 18) a pair of locking slots 280 and 284.

When the locking member 256 is inserted into the hinge post hole 236, the locking tabs 248 and 252 extend into the locking slots 280 and 284, respectively. The engagement of the locking tabs 248 and 252 with the slots 280 and 284 substantially prevents upward movement of the locking member 256 with respect to the hinge post 220, while allowing pivotal movement of the locking member 256 between a locked position (shown in phantom in FIG. 18) and an unlocked position (shown in solid lines in FIG. 18). The locking member 256 is not intended to be removed from the hinge post 220 once the locking member 256 is inserted in the hinge post hole 236 in this manner. The locking member 256 includes a pair of side projections 292 and 296, spaced 180° apart, to facilitate pivoting of the locking member 256 between the locked and unlocked positions.

When the locking member 256 is in the locked position and the hinge post 220 is placed over the mounting post head 208 (see FIGS. 16 and 18), the locking projections 276 are substantially aligned with the flexible projections 240 to prevent removal of flexible projections 240 from the annular recess 216 so that the hinge post 220 is releasably secured to the mounting post 204. When the locking member 256 is thereafter pivoted to the unlocked position, the locking projections 276 are brought into alignment with the gaps 244 to allow the flexible projections 240 to deflect outwardly and out of the annular recess 216 so that the hinge post 220 may be removed from the mounting post 204.

FIGS. 19–25 illustrate a toilet seat hinge 300 that is an alternative embodiment of the invention. Except as described below, the hinge 300 is substantially identical to the hinge 14, and common elements have been labelled with the same reference numbers. FIG. 19 is an exploded view of the toilet seat hinge 300. The hinge 300 comprises a mounting post 304 (see FIGS. 24 and 25) which is insertable into the toilet seat flange hole 26. The mounting post 304 includes a mounting post head 308 having therein an annular recess 310 defining a first engagement portion and a second engagement portion. In the preferred embodiment, the first and second engagement portions are opposite sides of the annular recess 310. In an alternative embodiment, the engagement portions could be separate recesses or projections instead of recesses.

Figure 24:
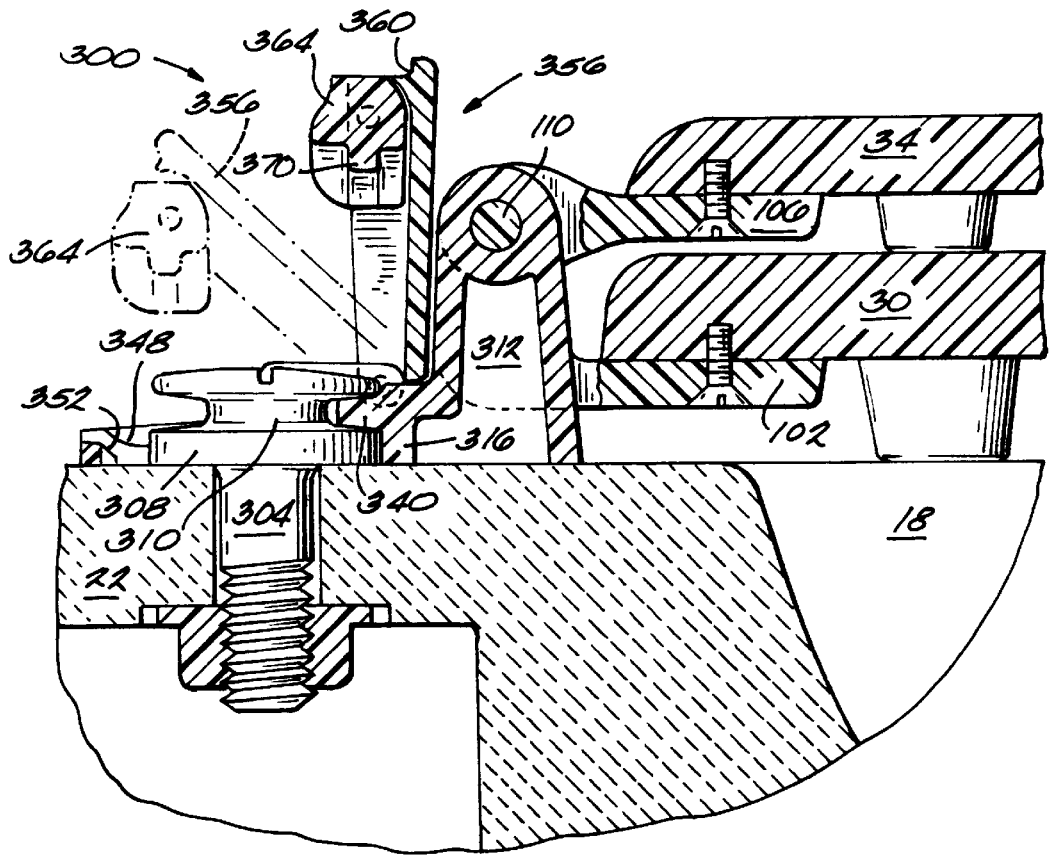
FIG. 24 is a cross-sectional view of the toilet seat and toilet seat hinge of FIG. 19, with the toilet seat hinge latch member in the unlocked position.
Figure 25:
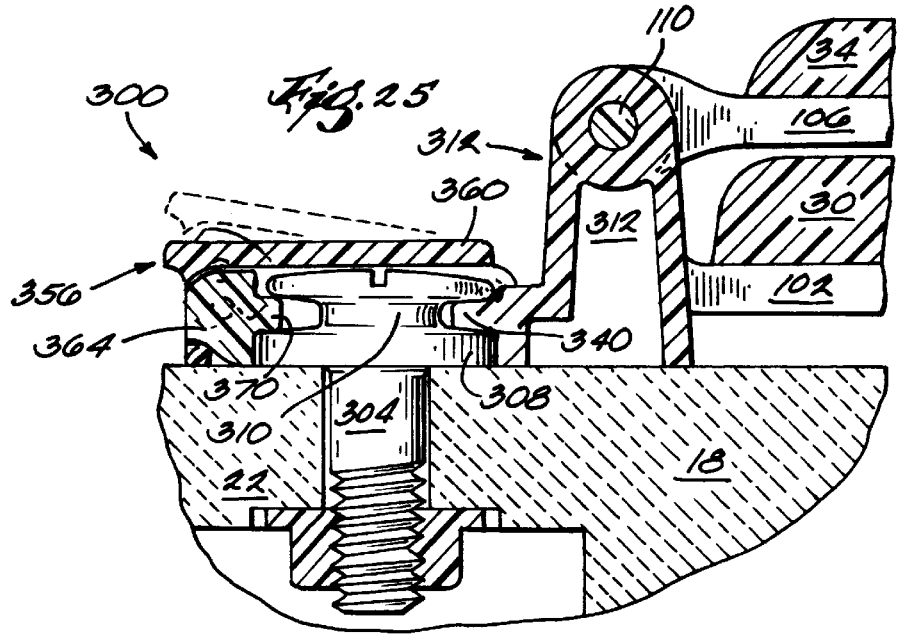
FIG. 25 is a cross-sectional view of the toilet seat and toilet seat hinge of FIG. 19, with the toilet seat hinge latch member in the locked position.

The toilet seat hinge 300 also comprises a hinge post 312 to which the toilet seat 30 and toilet cover 34 are pivotally attached (see FIGS. 24 and 25). The hinge post 312 includes a base portion 316. The base portion 316 includes an engagement portion 324 (see FIGS. 19 and 20). The base portion 316 has therein a pair of holes 332 (only one shown), the purposes of which will be described below. The hinge post engagement portion 324 includes a C-shaped projection 340 which defines one end of an opening 344 in the base portion 316. The hinge post 312 is positionable over the mounting post 304 and horizontally slidable relative to the mounting post (to the left in FIGS. 24 and 25) to a locking position (FIGS. 22 and 25) wherein the C-shaped projection 340 extends into one side of the mounting post annular recess 310. The base portion 316 also includes first camming surfaces 348 and a second camming surface 352, the purposes of which will be described below.

The toilet seat hinge also comprises a latch member 356 pivotally fixed to the hinge post 312. The latch member 356 includes a main portion 360, a first set of latch member pins 372 and 376, and a second set of latch member pins 380 and 384. The latch member pins 372 and 376 are insertable into respective hinge post pin holes 332 so that the latch member main portion 360 is pivotable relative to the hinge post 312. A locking member 364 includes a latch member engagement portion 368. In the illustrated construction, the engagement portion 368 includes a C-shaped projection 370. The locking member 364 has therein a pair of pin holes 388 (only one is shown). The latch member pins 380 and 384 are insertable into respective locking member pin holes 388 so that the locking member 364 is pivotable relative to the latch member main portion 360. The locking member 364 also includes first camming surfaces 396 and a second camming surface 400. When the latch member main portion 360 is pivoted downwardly relative to the hinge post 312 (as shown in phantom in FIGS. 24 and 25), the locking member camming surfaces 396 engage the hinge post camming surfaces 348 and the locking member camming surface 400 engages the hinge post camming surface 352. The engagement of the camming surfaces causes the locking member 364 to pivot relative to the latch member main portion 360 so that the locking member projection 370 extends into the mounting post annular recess 310. The engagement of the locking member projection 370 with the annular recess 310 in combination with the engagement of the C-shaped projection 340 with the recess 310 substantially prevents upward movement of the hinge post relative to the mounting post.

Various features of the invention are set forth in the following claims.

What is claimed is:

1. A toilet seat hinge comprising:

a mounting post fixable to a toilet bowl;

a hinge post pivotally connectable to a toilet seat, the hinge post being positionable over the mounting post; and a latch member having a top wall, the latch member engaging the hinge post, and the latch member being movable to a latched position wherein the latch member directly or indirectly engages the mounting post to substantially prevent upward movement of the latch member and the hinge post relative to the mounting post and wherein the top wall substantially completely covers the mounting post, and the latch member also being movable to an unlatched position wherein the latch member is directly or indirectly disengaged from the mounting post to allow upward movement of the latch member and the hinge post relative to the mounting post and the toilet bowl.

2. The toilet seat hinge of claim 1 herein the hinge post has therein a mounting post hole, the hinge post being positionable over the mounting post so that the mounting post extends into the mounting post hole.

3. The toilet seat hinge of claim 1 wherein the latch member is pivotable relative to the hinge post about a generally vertical axis between the latched and the unlatched positions.

4. The toilet seat hinge of claim 1 wherein said mounting post includes a threaded portion and wherein the toilet seat hinge also includes a nut, the nut being threadable onto the threaded portion so that the mounting post is secured to the toilet bowl.

5. The hinge of claim 1 wherein the latch member in the latched position indirectly engages the mounting post via the hinge post.

6. The hinge of claim 5 wherein the mounting post has therein a recess, wherein the hinge post includes a flexible projection, and wherein the latch member indirectly engages the mounting post by causing the flexible projection to extend into the recess in the mounting post.

7. The hinge of claim 6 wherein the latch member has a locking projection, the latch member being movable between a latched position wherein the locking projection latches the hinge post to the mounting post by preventing removal of the flexible projection from the recess and an unlatched position wherein the locking projection permits removal of the flexible projection from the recess.

8. The hinge of claim 6 wherein the latch member is movable between a latched position wherein the latch member latches the hinge post to the mounting post by preventing removal of the flexible projection from the recess and an unlatched position wherein the latch member permits removal of the flexible projection from the recess.

9. The hinge of claim 5 wherein the mounting post has therein a recess, wherein the hinge post includes a plurality of flexible projections, and wherein the latch member indirectly engages the mounting post by causing each flexible projection to extend into the recess in the mounting post.

10. The hinge of claim 9 wherein the mounting post has therein a single annular recess into which each flexible projection extends.

11. The hinge of claim 9 wherein the hinge post and flexible projections are a unitary member formed from injection molded plastic.

12. The hinge of claim 5 wherein the mounting post has therein at least one recess, wherein the hinge post includes a plurality of flexible projections, and wherein the latch member indirectly engages the mounting post by causing each flexible projection to extend into an associated recess in the mounting post.

13. The hinge of claim 12 wherein the latch member has a plurality of locking projections, the latch member being movable between a latched position wherein each locking projection latches the hinge post to the mounting post by preventing removal of an associated flexible projection from the associated recess and an unlatched position wherein each locking projection permits removal of the associated flexible projection from the associated recess.

14. The hinge of claim 12 wherein the latch member is movable between a latched position wherein the latch member latches the hinge post to the mounting post by preventing removal of each flexible projection from the associated recess and an unlatched position wherein the latch member permits removal of each flexible projection from the associated recess.

15. The hinge of claim 12 herein the flexible projections are angularly spaced about an axis to define therebetween gaps spaced angularly about the axis.

16. The hinge of claim 15 wherein the locking projections are angularly spaced about the axis so that the locking projections may be brought substantially into alignment with either the flexible projections or the gaps.

17. The hinge of claim 15 wherein the axis is a generally vertical axis.

18. The hinge of claim 12 wherein the latch member is mounted on the hinge post for pivotal movement between the latched and unlatched positions.

19. The hinge of claim 18 wherein one of the hinge post and latch member includes locking tabs and wherein the other of the hinge post and latch member includes locking slots, the locking tabs extending into the locking slots to substantially prevent upward movement of the latch member with respect to the hinge post and the locking tabs also limiting the movement of the latch member between the latched and unlatched positions.

20. The hinge of claim 19 wherein the recess opens outwardly and the flexible projections surround the mounting post.

21. A toilet seat hinge comprising:
a mounting post fixable to a toilet bowl, the mounting post including a head, the head having therein at least one recess;
a hinge post pivotally connectable to a toilet seat, the hinge post being configured so that the hinge post can be placed over the mounting post, and the hinge post including a plurality of flexible projections, each flexible projection extending into an associated recess in the mounting post when the hinge post is placed over the mounting post; and
a locking member movable between a locked position wherein the locking member engages the flexible projections and thereby locks the hinge post to the mounting post by preventing removal of each flexible projection from the associated recess and an unlocked position wherein the locking member permits removal of the hinge post from the mounting post by allowing removal of each flexible projection from the associated recess.

22. The hinge of claim 21 wherein the flexible projections are angularly spaced about an axis to define therebetween gaps spaced angularly about the axis.

23. The hinge of claim 22 wherein the locking member includes locking projections, the locking projections being angularly spaced about the locking member axis so that the locking projections may be brought substantially into alignment with either the flexible projections or the gaps.

24. The hinge of claim 22 wherein the axis is a generally vertical axis.

25. The hinge of claim 21 wherein the locking member includes a top wall, the top wall covering the mounting post.

26. The hinge of claim 25 wherein the latch member substantially covers the mounting post.

27. The hinge of claim 21 wherein the locking member is mounted on the hinge post for pivotal movement between the locked and unlocked positions.

28. The hinge of claim 27 wherein one of the hinge post and locking member includes locking tabs and wherein the other of the hinge post and locking member includes locking slots, the locking tabs extending into the locking slots to substantially prevent upward movement of the locking member with respect to the hinge post and the locking tabs also limiting the movement of the locking member between the locked and unlocked positions.

29. The hinge of claim 28 wherein the recess opens outwardly and the flexible projections surround the mounting post head.

30. The hinge of claim 21 wherein the mounting post head has therein a single annular recess into which each flexible projection extends.

31. The hinge of claim 21 wherein the hinge post and flexible projections are a unitary member formed from injection molded plastic.

* * * * *